United States Patent
Hirning

(10) Patent No.: US 9,566,874 B2
(45) Date of Patent: Feb. 14, 2017

(54) METHOD OF CHARGING CURRENT FOR AN ELECTRIC CAR AND CONTROL SYSTEM THEREFOR

(71) Applicants: Martin Hirning, Heidelberg (DE); Roland Münster, Heidelberg (DE); Torsten Blau, Heidelberg (DE); Carl Heckmann, Mannheim (DE); Christian Benz, Walldorf (DE); Benjamin Fischer, Oftersheim (DE)

(72) Inventor: Martin Hirning, Heidelberg (DE)

(73) Assignees: Martin Hirning, Heidelberg (DE); Roland Münster, Heidelberg (DE); Torsten Blau, Heidelberg (DE); Carl Heckmann, Mannheim (DE); Christian Benz, Walldorf (DE); Benjamin Fischer, Oftersheim (DE)

( * ) Notice: Subject to any disclaimer, the term of this patent is extended or adjusted under 35 U.S.C. 154(b) by 240 days.

(21) Appl. No.: 14/461,801

(22) Filed: Aug. 18, 2014

(65) Prior Publication Data

US 2015/0048800 A1 Feb. 19, 2015

(30) Foreign Application Priority Data

Aug. 19, 2013 (DE) .................. 10 2013 108 944

(51) Int. Cl.
*H02J 7/00* (2006.01)
*B60L 11/18* (2006.01)
(52) U.S. Cl.
CPC ........ *B60L 11/1838* (2013.01); *B60L 11/1809* (2013.01); *B60L 11/1818* (2013.01); *B60L 11/1824* (2013.01); *B60L 11/1848* (2013.01); *B60L 2230/22* (2013.01); *Y02T 10/7005* (2013.01); *Y02T 10/7094* (2013.01); *Y02T 90/121* (2013.01); *Y02T 90/128* (2013.01); *Y02T 90/14* (2013.01); *Y02T 90/16* (2013.01);
(Continued)

(58) Field of Classification Search
CPC ..................................... Y02T 90/14
USPC ....................................... 320/109
See application file for complete search history.

(56) References Cited

U.S. PATENT DOCUMENTS

2010/0039062 A1* 2/2010 Gu .................. B60L 8/003
320/101
2012/0249068 A1* 10/2012 Ishida ............... B60L 11/1816
320/109

(Continued)

FOREIGN PATENT DOCUMENTS

DE 10 2011 075 529 A1 11/2012
EP 2 367 255 A1 9/2011
(Continued)

*Primary Examiner* — Suresh Memula
(74) *Attorney, Agent, or Firm* — McGlew and Tuttle, P.C.

(57) ABSTRACT

A method for electricity purchase of an electric car (22) at a power charging procedure at a power charging station (30), which is connected to the grid (15), a PV system (10) or other domestic system for generating electricity is feeding current at a first measurement system (16) into the grid (15), and the electric car (22) charges current at a second measurement system (26) from a power charging station (30) where both measurement systems (16, 26) are integrated in a communication network (20) and are, at least indirectly, in communication connection (K1, K2) with each other to control the charging current, preferable to synchronize it with the fed in current.

20 Claims, 2 Drawing Sheets

(52) U.S. Cl.
CPC ............ *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2012/0286723 | A1* | 11/2012 | Ukita | G06Q 10/06312 320/107 |
| 2013/0015809 | A1* | 1/2013 | Frey | B60L 11/1824 320/106 |
| 2013/0049674 | A1* | 2/2013 | Davis | B60L 11/182 320/101 |
| 2013/0113413 | A1* | 5/2013 | Harty | H01M 10/465 320/101 |
| 2014/0049207 | A1* | 2/2014 | Nakagawa | B60L 11/1824 320/103 |
| 2014/0091747 | A1* | 4/2014 | Uyeki | B60L 11/184 320/101 |
| 2014/0125494 | A1 | 5/2014 | Hechtfischer et al. | |
| 2015/0061569 | A1* | 3/2015 | Alexander | B60L 11/1809 320/101 |
| 2015/0165915 | A1* | 6/2015 | Cun | B60L 11/1809 320/101 |
| 2015/0202973 | A1* | 7/2015 | Chang | B60L 11/1844 320/101 |
| 2016/0101704 | A1* | 4/2016 | McCalmont | H02J 7/35 320/101 |
| 2016/0134157 | A1* | 5/2016 | Maeno | H02J 7/007 320/101 |
| 2016/0141913 | A1* | 5/2016 | Wheatley | H02J 7/355 320/101 |

FOREIGN PATENT DOCUMENTS

| | | |
|---|---|---|
| EP | 2 324 327 B1 | 3/2013 |
| EP | 2 597 426 B1 | 10/2013 |

* cited by examiner

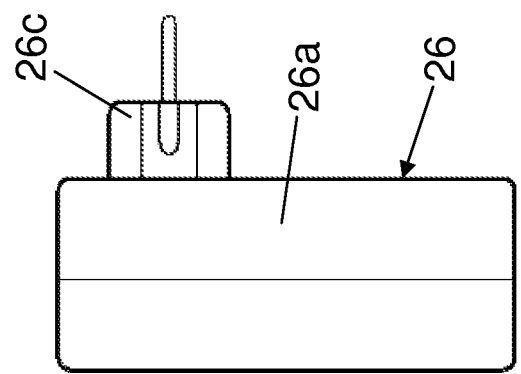
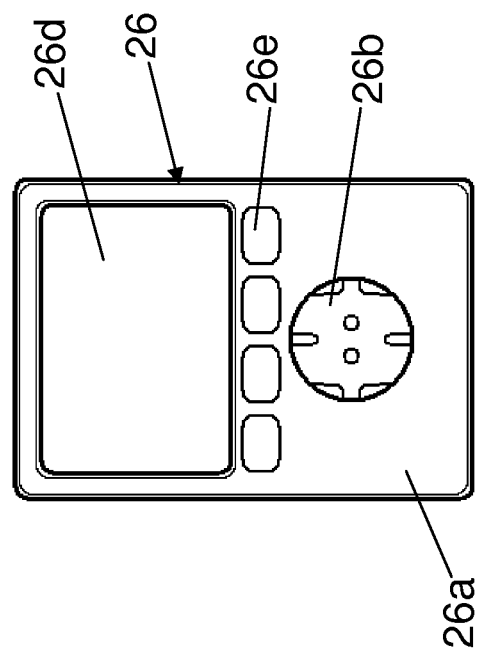

METHOD OF CHARGING CURRENT FOR AN ELECTRIC CAR AND CONTROL SYSTEM THEREFOR

CROSS REFERENCE TO RELATED APPLICATIONS

This application claims the benefit of priority under 35 U.S.C. §119 of German Patent Application DE 10 2013 108 944.5 filed Aug. 19, 2013, the entire contents of which are incorporated herein by reference.

FIELD OF THE INVENTION

The present invention relates to a method for charging current for an electric car during a charging procedure at a power charging station, which is connected to a grid, and a control system therefor.

BACKGROUND OF THE INVENTION

In DE 10 2011 075 529 A1 a method of this kind is described. A charging cable of the electric car is provided with an intelligent plug which communicates with a fitting power charging station. After an authentication the charging procedure starts. EP 2 324 327 B1 describes a mobile measurement system which is also communicating with the power charging station. Therefore, also a sophisticated authentication and billing system is intended for the charging procedure.

SUMMARY OF THE INVENTION

The invention is based on the object to improve the above mentioned method and to offer a control system therefore. This task will be solved by a method and a control system of the present invention.

The promotion by the German Renewable Energy Law (EEG) created a lot of photovoltaic (PV) systems on the roofs of houses. The current is, if no sufficient self consumption is existing, fed in the grid which generates during the day, especially during noon, current peaks. A storage in accumulators is due to their investment costs not economical. On the other hand, the number of electric cars is increasing, wherein the term electric cars should also comprise other mobile storage and consumption units, e.g. electric scooters and Segways. Especially, when using the electric car for the way to work, it is not at home when the PV system could supply electric current for charging the electric car as self consumption. If the owner of the PV system also owns an electric car it is meaningful to extend the self consumption remote off the house to a power charging station, in the simplest case to an insulated plug socket, on which the electric car can run its charging time, especially during noon time.

The possibility of the extension of the self consumption will be established according to the present invention by the intended control of the current charge. Based on the communication connection the mobile (the second metering system) has continuous, integrated or balanced information about the amount of electric energy which is fed in the grid at the first metering system. Thus, the charging procedure can be synchronized, that means that the electric car consumes only the amount of electric energy which is the for self consumption being fed in the grid and therewith available amount of electric energy. Suitable connections and business relations between metering point providers, grid operators and electric utility companies allow a billing of the amount of energy consumed by the electric car with this amount of energy which is fed into the grid.

The metering and measuring systems within the control system are, as defined by the German Energy Industry Law (EnWG), measuring systems which are embedded in a communication network or which can be embedded in this. The communication connections used are based on that, especially together with the metering point provider. The power charging station is preferably located where the electric car is parked during the day at work, e.g. in the yard of the employer. The power charging station can be also located at private houses to whom the owner of the electric car can have a more or minor close relationship (friends or relatives) or at public facilities, like hotels, restaurants, sports clubs, gyms, pubs etc. where leisure visits and stays of the electric car owner with his electric car can take place. A special technical design of the electric power station is not needed. However, security mechanisms or an authentication system can be provided to avoid unauthorized charging current.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a front view of the mobile second measuring system; and

FIG. 3 is a side view of the mobile second measuring system of FIG. 2.

DESCRIPTION OF THE PREFERRED EMBODIMENTS

Figure 1:
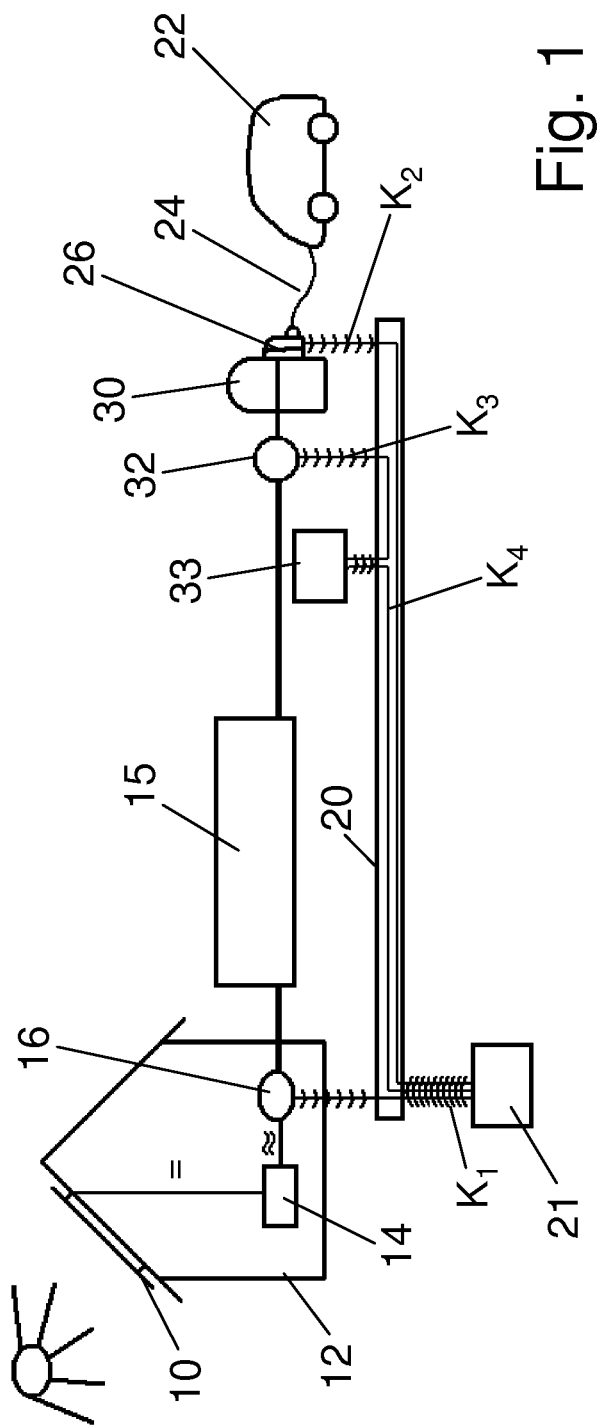
FIG. 1 is a schematic diagram of house, power charging station, electric car and grids.

Referring to the drawings in particular, FIG. 1, a PV system 10 (system to generate electric power from solar radiation energy) is on a house 12 installed, e.g. on a roof. In well-known method, the generated direct current by the PV system 10 is transformed by an inverted rectifier 14 into alternating current within the house 12. The generated alternating current will feed, optionally by interposition of an intermediate metering device, at the metering point of the house 12 into a connected grid 15.

The grid 15 (electric power network) means all the distribution grids and transmission grids, connected with each other, in the entirety of their technical and legal subcategorizations. As metering point a stationary first measuring system 16 is provided which is connected with the inverted rectifier 14 and with the grid 15 as well and it measures time-dependently the flowing current. A possible self consumption within the house 12 (household devices, heat pump, etc.)—which can be optimized by a suitable control unit—will be calculated by determination of the difference between the optional intermediate measurement device and the first measuring and metering system 16. Additionally or alternatively to the PV system 10, another house system for electric power generation can be provided/ imagined, e.g. a block heating station, wind mill or another renewable energy source which also feeds the power exceeding the self consumption at the first measurement system 16 into the grid 15.

The term "current" means the flowing electric charge per time, and term "amount of electric energy" is the time-integrated current, i.e. the electric charge. The amount of electric energy fed into the grid 15 at the first measurement system 16 is named following as fed in amount of electric energy from the PV system 10, independent from its generation and possible losses. The same is valid for the current, also independent of frequency and phase (DC, AC and three phase current).

The first measuring system 16 is additionally integrated into a communication network 20. The communication network 20 means all the wireless and wire-connected data and telecommunication networks in the entirety of their technical and legal subcategorizations. Preferably the integration of the first measurement system 16 is done wireless with a long range radio communication, e.g. long-term evolution (LTE). If necessary, alternatively or additionally, a connection is provided with a communication access which is located in house 12 and integrated into the communication network 20 whereas this connection can be wireless with a short range connection, e.g. wireless local area network (WLAN), or wire-connected, e.g. as telephone or local area network (LAN) cable.

A first metering point operator 21 is integrated in the communication network 20. Also a metering service provider can take over the function of the first metering point operator 21, in the following this will not be conceptually distinguished. The first measurement system 16 is connected by a communication connection K1 with the first metering point operator 21, in order to send to the first metering point operator 21 the measurement data, so the amount of electric energy and the time of alternating current, which is fed in the grid 15 by the PV system 10, is being transmitted. The first communication connection K1 is preferably built up in regular intervals, e.g. every 15 minutes, and after sending the measurement data (e.g. in the MSCONS format) it is being removed, but can be also organized in another way e.g. as a permanent connection. The first communication connection K1 is preferably bi-directional in order to be able to send an acknowledgment from the first metering point operator 21 to the first measurement system 16. In technical point of view the communication connection K1 is mainly comprised of wireless and wire-connected sections of the communication network 20.

In the following an electric car 22 is understood as a mobile storage and consumption unit for electricity without any limitations regarding the technical design, regarding hybrid propulsions or number of wheels. For the present embodiment the electric car 22 is in the possess of the operator of the PV system 10, e.g. by the ownership or suitably designed rental contracts or similar, but there are also other legal relationships possible.

To the electric car 22 a suitable power charging cable is allocated which can be fixed or releasably connected with the electric store (accumulator) of the electric car 22. A (free) end of the charging cable 24 could be designed for a contact-free—especially inductive or capacitive—transmission of current. According to invention the electric car 22 is allocated to a mobile second measurement system 26. The second measurement system 26 can be a plug adapter for the charging cable 24 or integrated in the charging cable 24, e.g. integrated in a plug of it. The measurement data of the second measurement system is the amount of electric energy and the time of the flow of current through the charging cable 24. Mainly the electric car 22 is taking the charging cable 24 and the second measurement system 26 on the drive.

The second measurement system is—at least temporarily—integrated into the communication network 20 mainly wireless with a long distance radio connection, e.g. LTE. The second measurement system 26 can build up the second communication connection K2 with the first metering point operator 21 to deliver its measurement data (e.g. MSCONS format) in certain intervals. This second communication system K2 is bi-directional that means that the second measurement system 26 is not only delivering measurement data to the first metering point operator 21, but also receives data by the first metering point operator 21.

The second measurement system 26 has preferably a unique identification (for itself or for the electric car 22 or for the operator of the PV system 10) which is e.g. stored in a chip of the second measurement system 26, on a chip card inserted into the second measurement system 26, or in a transponder fixed to the second measurement system 26. The unique identification is encrypted and if necessary only readable after performing further safety procedures (insert password or other individual personal data). Alternatively, the unique identification can be completely manually put into the second measurement system 26.

The electric car 22 can—by means of the charging cable 24—obtain current at the second measurement system 26 from a power charge station 30. Within this process it can be that the charging cable 24 is a fixed part of the electric car 22 or the power charge station 24 or removable with the respective object. The second measurement system 26 is generally allocated to the electric car 22. The power charge station 30 is—at a measuring point—connected to the grid 15. The power charge station has a third measurement system 32 as measurement point which is preferably (but not necessarily) integrated into the communication network 20, preferably wire connected. If the third measurement system 32 is integrated into the communication network, it can build up a third communication connection K3 to a second metering point operator 33. The third communication connection K3 can be bi-directional but it does not have to be. If the third measurement system 32 is not integrated into the communication network, then its measurement data has to be delivered manually to the second metering point operator 33.

The power charging station 30 is in case of the most simple design a plug socket connected to the grid 15, which can be used without any authentication for a one phase alternating current connection. There are also technically more complex designs of the power charging station 30 possible, in particular with special control devices or respective to the kind of the electrical connection. This can not only be a one phase alternating current connection for normal charging, but also a three phase or as a direct current connection for fast charging. Preferably, the power charging station 30 is located at the location of employment of the owner of the electric car 22 or another location which is mainly visited during day time especially during noon.

If the power charging station 30 needs an additional activation after an authentication, the clear identification of the second measurement system 26 can be used therefore. Between the second measurement system 26 and the power charging station 30 (or its third measurement system 32) a further communication connection can be intended, preferably wireless as short distance radio connection, e.g. WLAN or radio-frequency identification (RFID). With this short distance communication connection, the clear identification of the second identification system 26 is sent to the power charging station 30. After check of the identification, e.g. on a billing server of a network provider or respective service provider who is preferably also integrated into the communication network 20, the power charging station 30 is activated for the electric car 22. These kinds of methods are described for example in the EP 2 324 327 B1 or the DE 10 2011 075 529 A1. Other known authentications are possible as well.

The charging procedure starts in the simplest case by plugging in the charging cable 24 and the second measurement system 26 into the power charging station 30, which creates a connection between electric car 22 and power charging station 30. Promptly, also the second communication connection K2 should be built up that the second measurement system 26 can log in at the first metering point operator 21 (by sending a unique identification) and then can send its measurement data to the first metering point operator 21. In another design the second measurement system 26 blocks the connection electric car 22 and power charging station 30. After the second measurement system 26 has identified itself at the metering point operator 21, the connection between electric car 22 and power charging station 30 is activated. Within a more complex design referring to the configuration of a power charging station, the above described authentication via power charging station 30 is done, before it activates itself.

During the charging procedure current is flowing from the power charging station 30 into the electric car 22. The measurement data of the third measurement system 32, which can be also be responsible for more power charging stations 30, serve in well known kind for the later billing of the amount of electric energy which has been consumed by the electric car 22. Depending on structure and organization of the grid 15 more companies can be involved in that. The measurement data of the second measurement data 26 are transmitted to the first metering point operator 21 depending on the interval which is related to the charging procedure. This interval for data transmission can deviate from the interval of the first measurement system 16.

The first metering point operator 21 and the second measurement system 26 are exchanging data with each other after building up the second communication connection K2. According to the invention the first metering point operator 21 is sending immediately after the second communication K2 has been built up or on demand of the second measurement system 26 defined data which refer to the fed in amount of electric energy of the PV system 10, e.g. the measurement data of the first measurement system 16 or thereof derived data to the second measurement system 26. By this, a control of the consumed amount of electric energy of the power charging station 30 and the fed in amount of electric energy by the PV system 10 is built up especially a synchronization of this amount of electric energy is made possible. The synchronization can be temporarily active and/or temporarily integrated. Ideally, the electric car 22 charges not more current at the power charging station 30 as the amount which was fed in by the PV system 10. Preferably the charging procedure takes place during noon when the PV system 10 feeds in the maximum possible current into the grid 15. The synchronization becomes better if the intervals in which the first measurement system 16 and especially the second measurement system 26 are sending their measurement data, is shorter than the up to now usual 15 minutes, e.g. one minute.

In the control system for the synchronization of the amount of the electric energy, the first measurement system 16 for stationary usage in the house 12 (stationary smart meter) and the second measurement system 26 for the mobile usage with the electric car 22 (mobile smart meter) are building comprehensive pair, which can be handled as a unit or as a single as well. If needed, means when one person and his/her family own more electric cars 22 or operating more PV systems 10, then also more measurement systems 16, 26 can be embedded into the control system. Present both measurement systems 16, 26 are in indirect communication connection, by means of the first metering point operator 21 and both communication connections K1, K2. There are also use cases thinkable that the two measurement systems 16, 26 are directly in communication connection with each other, that means they synchronize themselves without interposition of the first measurement operator 21.

Preferably the first metering point operator 21 (or a third party) runs an account with the balance of the fed in amount of electric energy by the PV system 10 and the charged amount of electric energy by the electric car 22, whereas he calculates the balance from the received measurement data of both measurement systems 16, 26. It is preferred that the first metering point operator 21 sends the above named balance as defined data to the second measurement system 26. The balance can be continuously (means respective to the intervals for sending the measurement data) refreshed on the basis of the received measurement data from the first and second measurement system 16, 26. It is also possible that the balance sent by the metering point operator 21 is a historic value, e.g. the past day value or past month value and the second measurement value 26 only calculates a temporary balance without considering the current feedings of the PV system 10.

It is possible that the charging procedure stops independently from the charging state of the electric car 22, e.g. with a controllable switch in the second measurement system 26, if the balance of the fed in amount of electric energy by the PV system 10 and the consumed amount of electric energy by the electric car 22 comes close to a value of 0 or reaches 0. Usually, only a warning is being generated, e.g. optical on a display on the second measurement system 26 if necessary additionally or alternatively with an acoustic signal. With continued charging procedure external current is being loaded after the warning. It makes sense that the intended end of the power recharging procedure is put into the second measurement system 26 so that the log offs in the communication network 20 and/or at the power charging station 30 can be done, before the charging cable 21 is plugged out.

In order to create not only an amount wise relationship by the synchronization between the fed in amount of electric energy through the PV system 10 and the charged amount of electric energy by the electric car 22, but also a financial relationship, data transmissions are necessary.

For example a fourth communication connection K4 can be build up with the communication network 20 between the first metering point operator 21 and the second metering point operator 33—preferably regularly—with which data for the fed in amount of electric energy through the PV system 10 and the consumed amount of electric energy at the power charging station 30 by the electric car 22 can be sent or exchanged, with the result that the claim for remuneration for the amount of electric energy consumed by the electric car 22 at the power charging station 30 is conveyed from the operator from the PV system 10 and owner of electric car 22 to the owner of the power charging station 30. Data transfer could be for example per month.

In the simplest case the first metering point operator 21 and the second metering point operator 33 are identical with the involved grid operators, so that the data exchange by means of the fourth communication connection K4 is obsolete. It is also thinkable that different companies (metering point operators, grid operators, service providers, electricity suppliers) are involved, so that the claims for remuneration and amounts of electric energy are conveyed and charged amongst each other in a suitable way. Different contract relations, data flows and money flows will then be existing. It is also possible to arrange a pure transmission of current from the PV system 10 to the electric car 22, if necessary with respective transmission fees. The second measurement system 26 can be regarded as a mobile measuring point and each charging procedure could contain a change of the grid operator. It is also thinkable to bundle more PV systems and to use them as a common supplier for more electric cars 22 with changing charging points and measuring points.

In a preferred design the charging cable 24 is for a one phase AC connection and the second measurement system 26 is built as an adapter plug. Accordingly, the second measurement system 26 has a case 26a, in which a socket 26b and a plug 26c are integrated as shown in FIGS. 2 and 3, e.g. each in the grounding receptacle system (CEE 7/4).

According to FIG. 2, the second measurement system 26 has also a display 26d which is located in an opening of the case 26a. Furthermore, the second measurement system 26 has got operating elements 26e. If the display 26d is designed as a touchscreen then some display's parts serve as operating elements 26e, so that only basic functions (as "on" "off" or "emergency off") are separate operating elements 26e need to be arranged at the case 26a. If the display 26d is only used for picture presentation then more operating elements 26e are intended accordingly. Preferably the dimensions of the case 26a are small enough that other cases can be plugged in a row of plug sockets.

The constructional design of the second measurement system 26 allows a simple security mechanism for the power charging station 30. The power charging station 30 can have a plug socket whose diameter, depth and position of the contacts correspond to the earth wall socket system, but their electric contacts (phase, neutral wire) are deeper located than usual to the ground of the socket, that means a deeper building plug socket. To contact these lying contacts, the plug 26c has longer contact pins. In order to have a compatible plug 26c in connection with normal deep plug sockets, the longer contact pins are relatively movable to the case 26a, e.g. against a spring. These length-adjustable contact pins are inserted into the case 26a partially if the plug 26c is plugged in a normal plug socket.

Inside the case 26a of the second measurement system 26 are, a part of the particular measurement system for the current between plug 26c and plug socket 26b, a communication module for integrating the communication network 20, optional a communication module for the fourth communication connection K4 with the power charging station 30, a module for the authentication and encryption the input (authentication, end of power charging etc) and output (input control, status warning display, etc) a controllable switch for the current, at least one electrical fuse, a battery or accumulator, and a control unit for controlling the modules and inside equipment by a CPU. Additional modules are possible, e.g. a GPS receiver which delivers the location to the communication module, card reader, different plug sockets for USB or similar or to charge the accumulator. An unexpected interruption of the current, e.g. by tripping of the fuse in the second measurement system 26 or the fuse of the power charging station 30 or by unauthorized unplugging of the charging cable 24, can be shown optical and/or acoustical as a warning signal.

Preferably the current will be limited by the second measurement system 26, this happens significantly below the edge of the electrical fuse for the power charging station 30. On the one hand this action elongates the life cycle of the store in the electrical car 22 instead of shortening its life cycle by high current strength and high volatility. On the other hand a security buffer is obtained for the synchronization with the PV system 10 that means a better adaptation of the charged current by the electrical car 22 and the fed in current by the PV system 10 is possible, either with a permanently refreshed data flow by the first metering point operator 21 for the real fed in current or temporally integrated to the total amount of fed in current. A limitation to 3.6 kW after 8 hours charging time results in 29.4 kWh what can correspond to cruising range of 200 km.

The power charging station may be any plug socket, where the second measurement system can be plugged in. The power charging station may be external, which means remote from the house and its domestic grid. The metering point operator may be a company or individual, which does commercial and/or technical services for electrical metering points. In most cases the grid operator fulfills this task within his or her grid area. The metering service provider may be a company or individual, which does commercial services for electrical metering points. The grid operator may be a company, which is responsible for running the electric grid, in most cases grid operators are running only distribution grids. In Germany there are about 890 distribution grid operators. For the transmission grid there are four companies responsible. The electric utility company may be a company, which provides end consumers electric power independent of the end consumer's location, that means in various distribution grids.

While specific embodiments of the invention have been shown and described in detail to illustrate the application of the principles of the invention, it will be understood that the invention may be embodied otherwise without departing from such principles.

What is claimed is:

1. A method for charging current for an electric car during a charging procedure at a power charging station which is connected to a grid, the method comprising:
    providing a photovoltaic system or another domestic system for electricity generation;
    feeding in current at a first measurement system into the grid from said photovoltaic system or said another domestic system;
    providing an electric car, said electric car charging current at a second measurement system from the power charging station;
    providing a communication network, said first measurement system and said second measurement system being integrated into said communication network, wherein said first measurement system and said second measurement system are at least indirectly in communication connection with each other to control said charging current.

2. The method according to claim 1, wherein the charging current at the second measurement system is synchronized by means of the communication connection with the current fed in at the first measurement system.

3. The method according to claim 2, wherein the first measurement system sends first measurement system data to a first metering point operator or metering service provider via a first communication connection, said first metering point operator or metering service provider receiving second measurement system data from said second measurement system via a second communication connection, said second measurement system being in bilateral communication with said first metering point operator or metering service provider via said second communication connection.

4. The method according to claim 3, wherein the first metering point operator or metering service provider sends the first measurement system data to the second measurement system.

5. The method according to claim 3, wherein the first metering point operator or metering service provider sends derived data to the second measurement system.

6. The method according to claim 5, wherein said derived data comprises a balance of fed in current and charging current.

7. The method according to claim 3, wherein the power charging station comprises a third measurement system of a second metering point operator or metering service provider, with the first metering point operator being in connection with the third measurement system, in order to set against the charged amount of electric energy at the second measurement system from the power charging station with the fed in amount of electric energy at the first measurement system.

8. The method according to claim 4, wherein the power charging station comprises a third measurement system of a second metering point operator or metering service provider, with the first metering point operator being in connection with the third measurement system, in order to set against the charged amount of electric energy at the second measurement system from the power charging station with the fed in amount of electric energy at the first measurement system.

9. A control system for charging current of an electric car during a charging procedure at a power charging station, which is connected to a grid, the control system comprising:
a photovoltaic system or another domestic system for electricity generation at a first measurement system, said first measurement system being connected to the grid;
an electric car at a second measurement system, said electric car being connectable at a power charging station to receive a charging current;
a communication network, said first measurement system and said second measurement system being integrated into said communication network and said first measurement system and said second measurement system being, at least indirectly, in a communication connection with each other to control said charging current.

10. The control system according to claim 9, wherein a current purchase at the second measurement system is synchronized with current fed in at the first measurement system by the communication connection.

11. The control system according to claim 10, wherein the first measurement system is in communication with said first metering point operator or metering service provider via a first communication connection, said first measurement system sending first measurement system data to said first metering point operator or metering service provider via said first communication connection, said first metering point operator or metering service provider being in bilateral communication with said second measurement system via a second communication system, said first metering point operator or metering device receiving second measurement system data via said second communication system.

12. The control system according to claim 9, wherein the first measurement system is provided for stationary use in a house.

13. The control system according to claim 12, wherein said second measurement system is provided for mobile use with the electric car.

14. The control system according to claim 13, wherein the second measurement system comprises an adapter plug for a charging cable of the electric car, said second measurement system further comprising a plug.

15. The control system according to claim 14, wherein said plug has length adjustable contact pins.

16. A method for charging current for an electric car during a charging procedure at a power charging station which is connected to a grid, the method comprising:
providing a domestic electricity generating system;
providing a first measurement system;
delivering current into the grid from said domestic electricity generating system, said first measurement system being connected to at least said grid;
providing a second measurement system;
providing a charging station;
providing an electric car, said electric car receiving charging current from said charging station, said second measurement system being connected to said electric car;
providing a communication network, said first measurement system and said second measurement system being connected to said communication network, wherein said first measurement system is, at least indirectly, in communication with said second measurement system via said communication network;
controlling said charging current based on at least first measurement system data from said first measurement system.

17. The method according to claim 16, wherein said first measurement system measures said current delivered into the grid via said domestic electricity generating system, said first measurement system data corresponding to an amount of said current delivered into the grid via said domestic electricity generating system, said second measurement system determining an amount of said charging current delivered to said electric car.

18. The method according to claim 17, wherein the charging current at the second measurement system is synchronized based on at least said first measurement system data.

19. The method according to claim 16, further comprising:
providing a first metering point operator or metering service provider, said first metering point operator or metering service provider receiving said first measurement system data via a first communication connection, said first metering point operator or metering service provider receiving second measurement system data from said second measurement system via a second communication connection, said second measurement system being in bilateral communication with said first metering point operator or metering service provider via said second communication connection.

20. The method according to claim 19, wherein said second measurement system receives said first measurement system data via said first metering point operator or metering service provider.

* * * * *